United States Patent
Javadekar et al.

(10) Patent No.: US 11,204,843 B2
(45) Date of Patent: *Dec. 21, 2021

(54) DISASTER RECOVERY IN A DISTRIBUTED FILE SYSTEM

(71) Applicant: EMC IP Holding Company LLC, Hopkinton, MA (US)

(72) Inventors: Shrinand Javadekar, Sunnyvale, CA (US); Vijay Panghal, Santa Clara, CA (US); Deepti Chheda, San Francisco, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/686,450

(22) Filed: Nov. 18, 2019

(65) Prior Publication Data

US 2020/0081796 A1 Mar. 12, 2020

Related U.S. Application Data

(63) Continuation of application No. 14/755,744, filed on Jun. 30, 2015, now Pat. No. 10,489,248.

(51) Int. Cl.
*G06F 12/00* (2006.01)
*G06F 11/14* (2006.01)
*G06F 3/06* (2006.01)

(52) U.S. Cl.
CPC ......... *G06F 11/1451* (2013.01); *G06F 3/065* (2013.01); *G06F 3/067* (2013.01); *G06F 3/0619* (2013.01); *G06F 11/1435* (2013.01); *G06F 2201/84* (2013.01)

(58) Field of Classification Search
CPC ............. G06F 12/0862; G06F 12/1009; G06F 2212/657; G06F 2212/6026; G06F 17/30132; G06F 11/1451; G06F 3/065; G06F 3/0619; G06F 3/067; G06F 11/1435; G06F 2201/84
See application file for complete search history.

(56) References Cited

U.S. PATENT DOCUMENTS

| | | |
|---|---|---|
| 2004/0030951 A1 | 2/2004 | Armangau |
| 2007/0260830 A1 | 11/2007 | Faibish |
| 2010/0070726 A1 | 3/2010 | Ngo |
| 2013/0013874 A1 | 1/2013 | Graefe |
| 2013/0046740 A1 | 2/2013 | Li |
| 2014/0149357 A1 | 5/2014 | Gupta |

(Continued)

OTHER PUBLICATIONS

A non-blocking algorithm for shared queues using compare and swap, 1991 (Year: 1991).

(Continued)

*Primary Examiner* — Arvind Talukdar
(74) *Attorney, Agent, or Firm* — Workman Nydegger

(57) ABSTRACT

A snapshot is received at the MDS from a backup storage location at a point-in-time subsequent to taking the snapshot, wherein the MDS comprises a map identifying an object store location for a plurality of data objects and a queue identifying individuals of the plurality of data objects that only reside on the transient object store. Individuals of the plurality of data objects identified in the queue are located on the distributed file system. The map is updated to identify the object store location for the individuals of the plurality of data objects identified in the queue.

20 Claims, 7 Drawing Sheets

(56) References Cited

U.S. PATENT DOCUMENTS

2014/0201160 A1    7/2014   Kumarasamy
2015/0261674 A1    9/2015   Wei

OTHER PUBLICATIONS

A Transparently-Scalable Metadata Service for the Ursa Minor Storage System, 2010 (Year: 2010).
Loosely Time-Synchronized Snapshots in Object-Based File Systems, 2010, Sec 4.1 (Year: 2010).
Lustre 2.0 Operations Manual, 2010, p. 23-12 (Year: 2010).
Multi-Master Replication for Snapshot Isolation Databases, 2013, (Year: 2013).
SAP with Oracle on Windows and NetApp Storage, 2010, (Year: 2010).
Snapshots in Large-Scale Distributed File Systems, 2013 (Year: 2013).
Veritas Volume Replicator Administrator's Guide, 2009 (Year: 2009).

DISASTER RECOVERY IN A DISTRIBUTED FILE SYSTEM

FIELD OF THE INVENTION

This invention relates generally to distributed file systems, and more particularly to systems and methods for disaster recovery in a distributed file system.

BACKGROUND OF THE INVENTION

Distributed file systems manage files and folders spread across multiple computers. They may serve a similar function as traditional file systems, but are designed to provide file/folder storage and controlled access over local and wide area networks. Some individuals and/or enterprises may rely on distributed file systems to manage their personal and/or organizational data.

There is a need, therefore, for an improved method, article of manufacture, and apparatus for accessing a distributed file system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
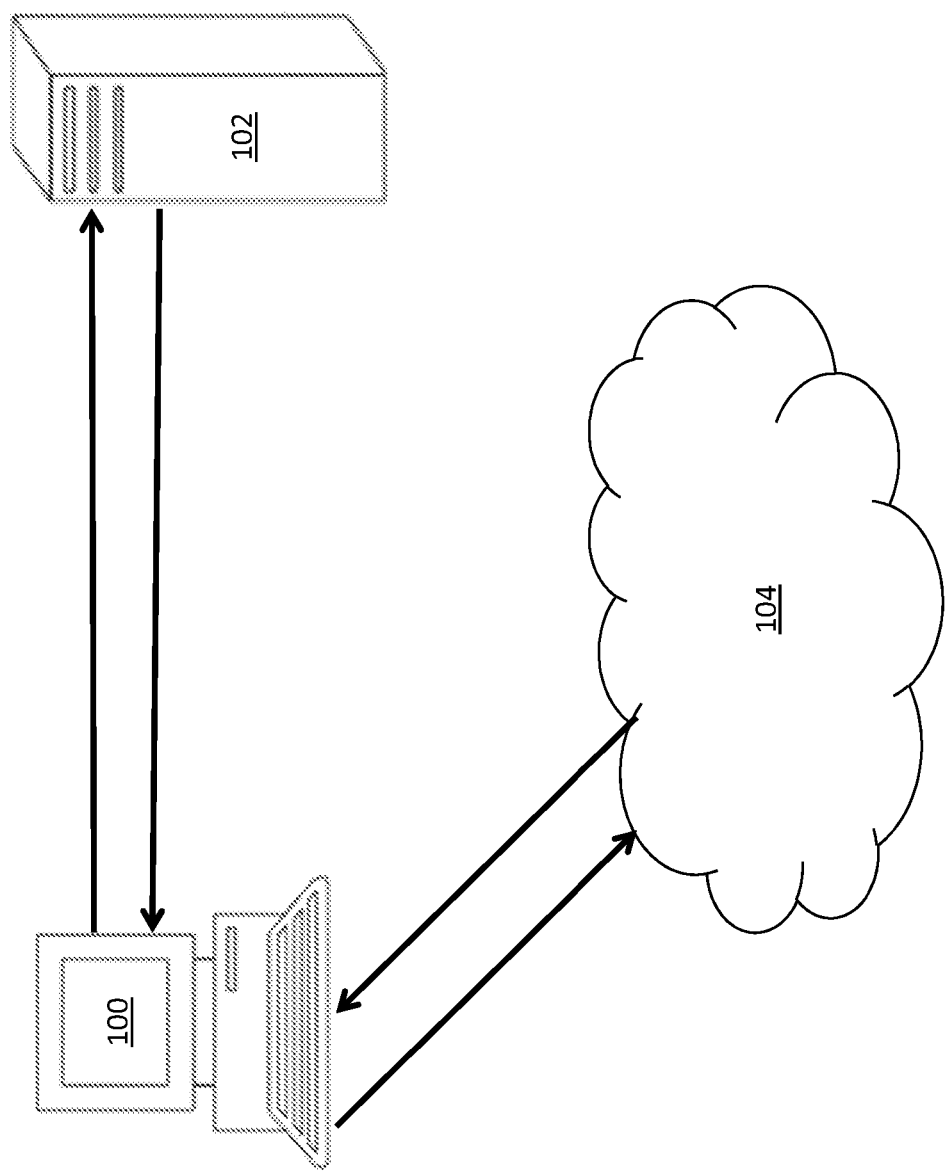
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure provide a site cache for processing IO requests on a distributed file system. Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon S3, Microsoft Azure, Google Drive, a private object store, and/or a hybrid object store. Access to the data on these object stores may be managed by a metadata server, which could be a local or remote server from the client.

While cloud based object stores may create the appearance of a single object store, the data may actually be physically stored across multiple datacenters that are geographically diverse. For example, portions of data may be stored at data centers in both California and Arizona, while still being part of the same logical object store. Clients that are not physically located near an object store may experience a negative performance impact when issuing IO requests to that store. For example, it may take longer for a client in New York to write data to an object store located in California than it would if the object store were located at the client's site. The present disclosure provides a site cache to compensate for this performance degradation.

An embodiment of the present disclosure provides a site cache at client sites. For example, if clients are spread across multiple branch offices, each branch may have its own site cache. Access to the site cache may be provided to each client over a high bandwidth, low latency connection. This may be contrasted with a lower bandwidth, higher latency connection to an authoritative object store, such as a public cloud. Clients may issue IO requests to the site cache via a metadata server, and the site cache may service those requests if it is able. This allows the clients to realize the performance benefits of a local object store, while still being able to access a geographically diverse distributed file system.

Site cache's may, however, complicate disaster recovery operations. In an embodiment, location information for all the data objects in a system may be centralized on a metadata server ("MDS"). Backups of this MDS may be necessary to preserve the integrity of the distributed file system. If a site cache is flushed between backups, however, and a previous backup is used to restore the MDS, the MDS may have incorrect location information for those flushed objects. The methods, systems, and processes discussed herein alleviate these concerns.

FIG. 1 depicts a system implementing a distributed file system in a cloud environment. The system of FIG. 1 may include client 100, MDS 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Additionally or alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be an OpenStack Swift instance operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other type of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system and/or a container on the object store used by the distributed file system, and <object identifier> identifies the object to be read. In an embodiment, the object identifier is a hash of the object and/or a hash of a version of the object. The object identifier could also be, for example, a sequential number assigned by the MDS. Additionally of alternatively, the object identifier could be both a hash of the object, and a unique integer identifier assigned by the MDS.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object or a hash of a version of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST and/or PUT. The POST and/or PUT request may include the data object client 100 wishes to store on object store 104. In some embodiments client 100 may conclude that the write was successful after the post was sent and terminate the write process. Alternatively, client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
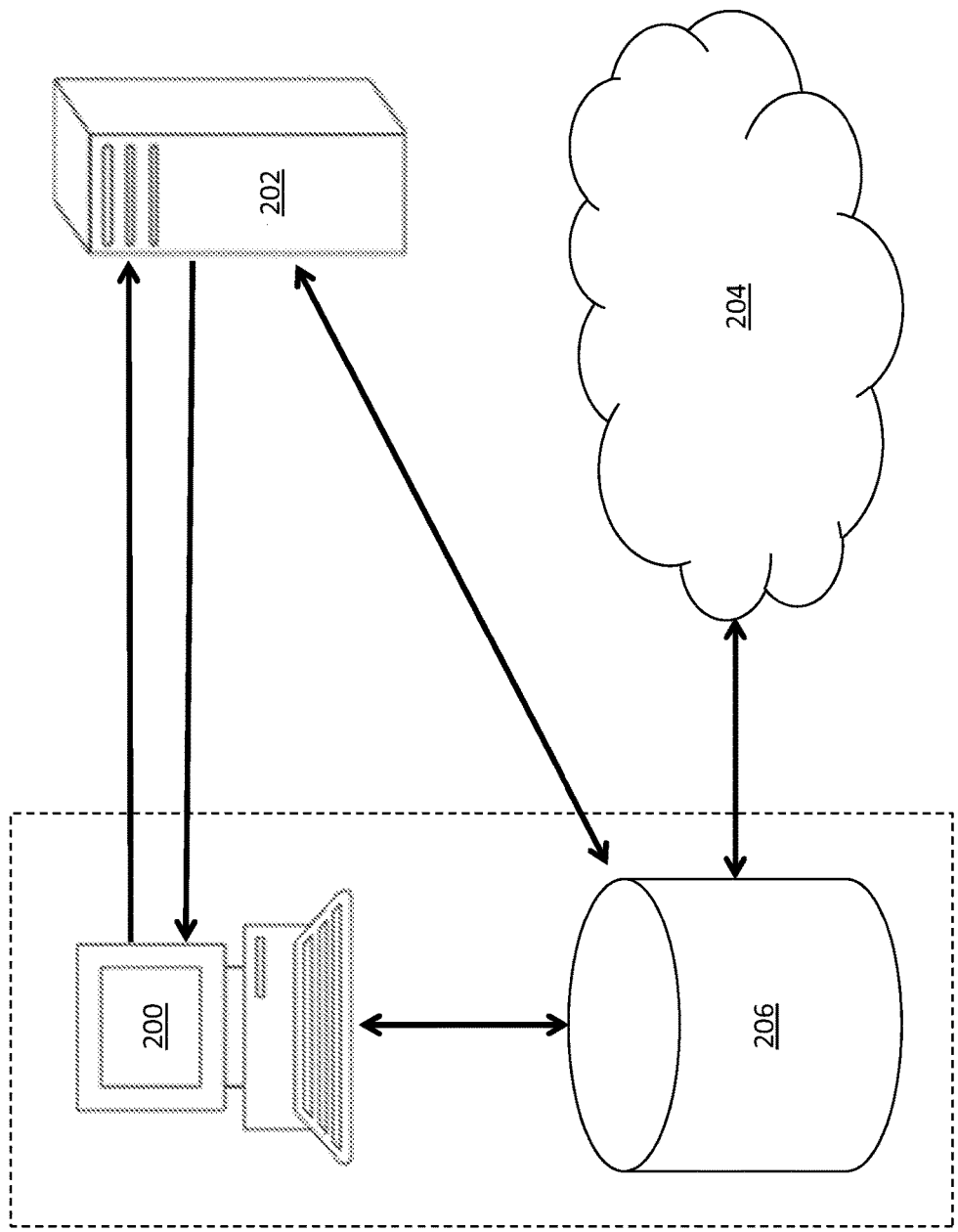
FIG. 2 depicts a system architecture for a distributed file system using a site cache consistent with an embodiment of the present disclosure.

Turning now to FIG. 2, a system providing a distributed file system using a site cache is discussed. FIG. 2 may comprise client 200, MDS 202, and object store 204. In some embodiments, client 200 may be similar to client 100, MDS 202 may be similar to MDS 102, and authoritative object store 204 may be similar to object store 104. FIG. 2 may also include site cache 206, which may be physically located at or near client 200 as showed by the dashed box. While not shown, the system of FIG. 2 may include a plurality of locations, and some locations may have a site cache while other locations do not. While MDS 202 is shown at a separate location in FIG. 2, an embodiment of the disclosure may have MDS physically located at or near client 200 and/or site cache's 206 location.

Site cache 206 may comprise a transient object store capable of storing data object and/or data segments. In an embodiment, the transient object store is similar to the authoritative object store. For example, the transient object store may be a local cloud storage install, such as a local OpenStack Swift install, while the authoritative object store may be a public cloud storage, such a hosted Microsoft Azure instance. The transient object store may be capable of storing data and responding to read and/or write requests in the same manner as object store 104 discussed in reference to FIG. 1.

In some embodiments, client 200 may be in communication with site cache 206 over a high bandwidth, low latency connection. While not shown, client 200 may also be in communication with authoritative object store 204 over a lower bandwidth, higher latency connection. When possible, client 200 may prefer to have IO requests processed by site cache 206 to take advantage of the superior connectivity.

Figure 3:
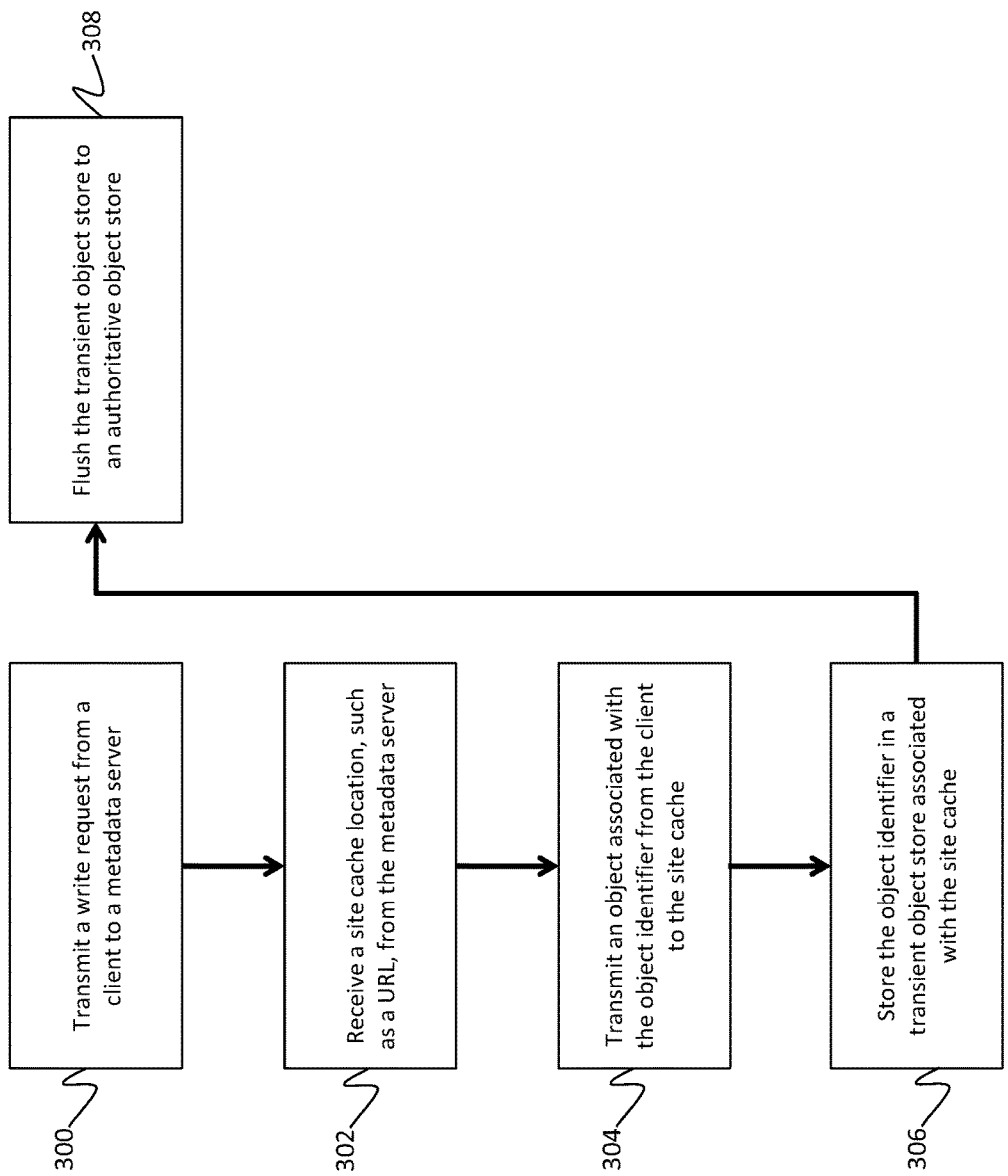
FIG. 3 depicts a process for writing data to an authoritative object store via a site cache consistent with an embodiment of the present disclosure.

FIG. 3 depicts a process for using a site cache similar to that shown in FIG. 2. This process could be used, for example, to efficiently process IO requests to a geographically diverse distributed file system. In one embodiment, the site cache is particularly efficient in processing write requests, though it may also be used to read data (as discussed below).

At block 300, a write request may be transmitted from a client to metadata server. For example, client 200 may have a piece of data to write to the distributed file system. MDS 202 may process read and/or writes to the distributed file system as discussed above. Client 200 may therefore transmit a write request for the data to MDS 202 for processing.

Upon receiving the write request from the client, MDS 202 may consult a metadata table to determine whether the data the client wishes to write already exists in a site cache and/or an authoritative object store. For example, MDS 202 may compare the object identifier to a listing of object identifiers in the metadata table. If there is a match and/or if that object identifier is associated with a site cache and/or authoritative object store, it may not be necessary to write the data a second time. MDS 202 may transmit a write complete to the client and the process may terminate. If the data is new, MDS 202 may attempt to identify a site cache the client may use for writing the data.

If the data to write is new, MDS 202 may attempt to identify a site cache for the client. MDS 202 may contain a listing of site caches and their locations. MDS 202 may determine where the client if located and associate a site cache with that client. For example, the client may inform MDS 202 that it is located in a New York branch office, and MDS 202 may identify a site cache associated with that office. Alternatively, client 200 may send a preferred site cache to MDS 202. This could occur, for example, if the MDS previously returned a plurality of site caches, as discussed in reference to FIG. 5, or if the client has been configured to use a particular site cache. If the client's site does not include a site cache, MDS 202 may identify authoritative object store 204 as the best location to write the data. Once MDS 202 has identified a site cache, the site cache location may be returned to the client.

At 302, a site cache location may be received at the client from the MDS. For example, client 200 may receive a URL, domain, or other network identifier for site cache 206 from MDS 202. In some embodiments, this site cache location may also include a container identifier and/or an object identifier, as discussed in reference to FIG. 1. The site cache location may therefore comprise all the information client 200 needs to write the desired data object to site cache 206.

At block 304, an object associated with the object identifier may be transmitted from the client to the site cache. For example, client 200 may use the URL returned from MDS 202 to transmit a data object to site cache 206. In some embodiments, client may use an HTTP POST to transmit the data to the site cache.

At 306, the object and/or the object identifier may be stored in the transient object store associated with the site cache. For example, site cache 206 may include a non-transitory, computer readable storage medium. The object may be stored on that medium for future retrieval.

In some embodiments, the MDS may maintain location information for all the data objects in a system. For example, the MDS may store the information in a database entry associated with the object identifier. In an embodiment, the data object location information is stored as a bit map with each bit in the map corresponding to a different object store location. For example, if there are five object stores in the system, such as four transient object stores and one authoritative object store, the bitmap may be five bits long. Each bit may be associated with one store. If the data object is present in a store, that store's bit may be 1 while the other bits are 0. Alternatively, bits may be set for object stores that do not contain the data object, while those that do contain the object are 0. When a data object is first written to the transient object store, that transient object store's associated bit may be set to 1. This set could occur when the client first requests a write URL, such as at block 300 or 302, or by transmitting a final commit request to the MDS after the data object has been stored in the transient object store.

Once the object and/or identifier has been stored to the transient object store, the client may believe the write process is complete. The client may interact with the written data as though it was stored in authoritative object store 204, and may not be involved any further in the write process. Since the connection between the client and the site cache is superior that the connection between the client and the authoritative object store, the write process may complete much faster than if the client was attempting to write straight to the authoritative object store.

Finally, at 308, the site cache may be flushed to the authoritative object store. For example, site cache 206 may flush its data to authoritative object 204. Flushing the data allows easier access for other clients in the system, as discussed below, and may provide long-term storage of the data objects. The site cache may be flushed on a scheduled basis, such as weekly, or each time it exceeds a storage threshold, such as 80% available capacity. Additionally or alternatively, the site cache may be flushed using a first-in-first-out and/or a least-recently-used algorithm.

Figure 4:
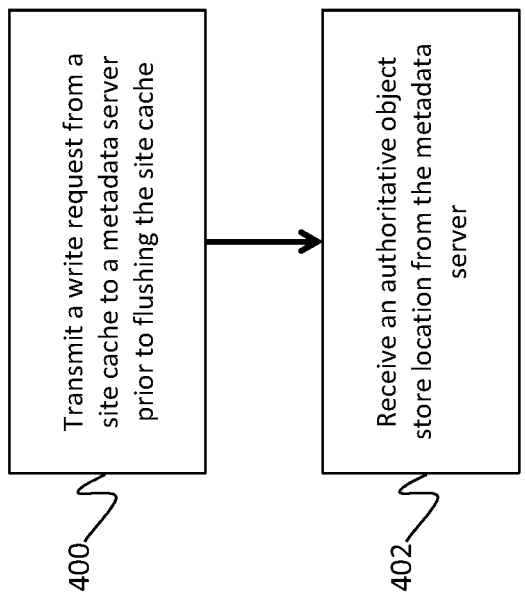
FIG. 4 depicts a process for flushing a site cache consistent with an embodiment of the present disclosure.

FIG. 4 depicts a process for flushing the site cache. Flushing the site cache may require updating information at the metadata server. As noted above, the MDS may maintain location information for all of the data in the system. If the site cache is flushed without updating the MDS, this location information may be out of date. A client attempting to read the data may be directed to the site cache that no longer contains the data, rather than to the authoritative object store. The process of FIG. 4 allows the MDS to correctly update data object locations to allow the data to be read from the correct source.

At block 400, the site cache may transmit a flush write request to the MDS. This write request may be substantially similar to those transmitted from the client to the MDS, and may be processed in the same way. In an embodiment, the process is identical with the site cache operating as a client.

Once the MDS receives the write request it may construct a write URL for the authoritative object store. In an embodiment, the MDS may first verify that the data does not already exist in the system. This check may also be skipped, however, since it already occurred when the client wrote the data to the site cache. The MDS may transmit the write URL back to the client once it has been constructed.

The MDS may also update the location information associated with the data object in its local metadata table. For example, the MDS may set the transient object store's bit in the location bitmap to 0 and set the authoritative object store bit to 1. This may occur before, during, or after the URL is transmitted back to the site cache. Updating the location information may comprise updating the table to associate the data object with the authoritative object store rather than the transient object store. This allows the MDS to direct future read requests to the correct location.

At block 402, the site cache may receive the URL from the MDS. This URL may then be used to flush the site cache to the authoritative object store. For example, the site cache may issue an HTTP POST and/or PUT to the authoritative object store, where the body of the POST and/or PUT contains the data to be transferred. Once the data is successfully transferred from the site cache to the authoritative object store it may be removed from the transient object store.

In some embodiments, flushing a site cache may be wholly or partially managed by a cache task queue. The task queue may reside on the MDS, and may identify data objects that reside in a site cache and have not been flushed to the authoritative object store. The queue may track the data objects using an object identifier that may be used to obtain the data object location using the bitmap discussed above. Data objects may be removed from the task queue as they are flushed from the site cache to an authoritative object store. In an embodiment, each site cache has its own site cache queue. Additionally or alternatively, the MDS may maintain one queue for all the cached data objects in the system.

The MDS may flush a site cache continually using the cache task queue. For example, the MDS may remove data objects from the queue using a FIFO algorithm. As data objects are selected from the queue, the MDS may contact the site cache and request those objects be flushed to the authoritative object store. Additionally or alternatively, the MDS may batch data objects together and instruct the site cache to flush the objects in bulk. Other flushing techniques are consistent with the present disclosure.

Figure 5:
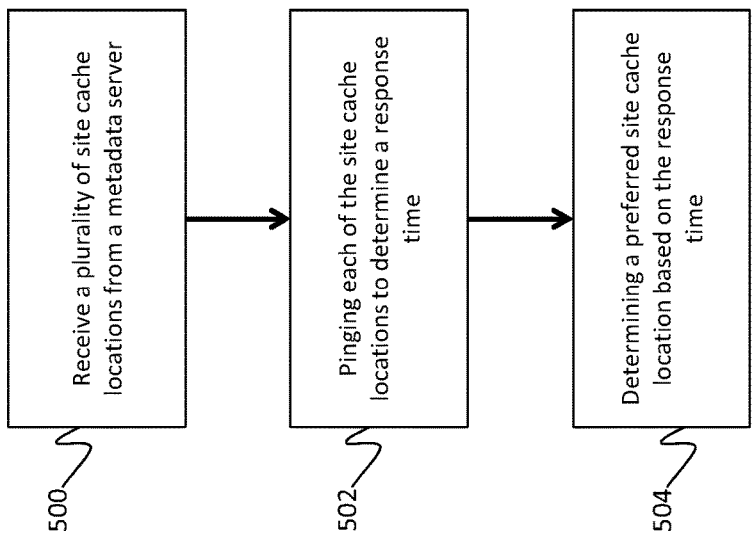
FIG. 5 depicts a process for identifying a preferred site cache consistent with an embodiment of the present disclosure.

Turning now to FIG. 5, a process for selecting a site cache is discussed. This process could run, for example, before a client attempts to write any data, when the client mounts the distributed file system, or on demand. Additionally or alternatively, it may run when a client attempts to write data without specifying a preferred site cache to the MDS. In some embodiments the process is only run once, while in others it is run multiple times.

At block 500, a client receives a plurality of site cache locations from a metadata server. For example, client 200 may receive a plurality of site cache locations from MDS 202. These locations could be, for example, a URL to access the site cache. The site cache locations may include every site cache in the system, regardless of whether it is located at the client's site or a different site.

At 502, the client may ping each of the site cache locations to determine a response time. For example, the client may issue an HTTP GET and/or POST to each of the site cache locations and wait for a response. Site caches with a shorter response time may be closer to the client, and/or may have a superior connection. Additionally or alternatively, the responses may include site cache location information in the headers and/or payload, which may be used to determine the site cache nearest to the client.

Finally, at 504 a preferred site cache location may be determined based on the response time. This preferred site cache location may be stored at the client and provided to the MDS during write requests, as discussed above. In some embodiments, the site cache with the shortest response time is the preferred site cache.

Figure 6:
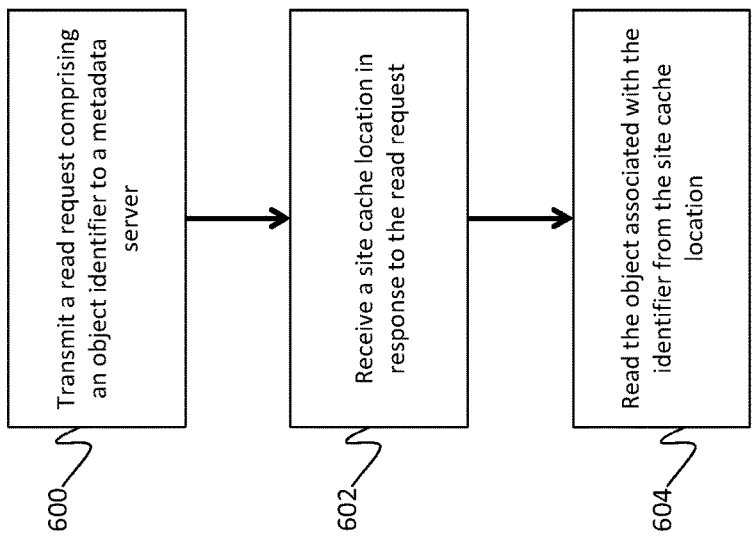
FIG. 6 depicts a process of reading data from a site cache consistent with an embodiment of the present disclosure.

FIG. 6 depicts a process for reading data from a site cache. In some embodiments, this read process may be similar to that discussed in reference to FIG. 1. Clients may need to read data from the site cache when, for example, it has not yet been flushed to the authoritative object store. In some embodiments, every site cache in the system is accessible by every client, thereby allowing any client to read data that has not been flushed to the authoritative objects store.

At block 600, a read request comprising an object identifier is transmitted to the metadata server. This read request could include, for example, an identifier associated with an object the client wishes to read.

The metadata server may consult a metadata table to determine the object's location. For example, the metadata server may consult a object location bitmap stored in a metadata table. If the data object has been flushed to an authoritative object store, a read URL for the object store may be returned to the client. If the data has not been flushed to the authoritative object store, but rather exists on a site cache, a read URL for that site cache may be returned to the client. This read URL may be substantially similar to that pointing to the authoritative object store, with the exception that the domain points to the site cache. Additionally or alternatively, the data object may exist in both a site cache and the authoritative object store. The metadata server may generate a URL for both the site cache and the authoritative object store. The client may then attempt to retrieve the data from the site cache first, and the authoritative object store second if there is a failure. Alternatively, the client may decide to only read from the authoritative object store and not the site cache.

A 602, the client may receive the site cache location from the MDS in response to the read request. The site cache location may be for a local site cache, or it may be for a site cache at a different location.

Finally, at 604, the object associated with the identifier may be read from the site cache. In some embodiments, the object may be read from the site cache by transmitting an HTTP GET from the client to the URL provided by the MDS. The site cache may transmit the desired data back to the client in response to the GET request.

Figure 7:
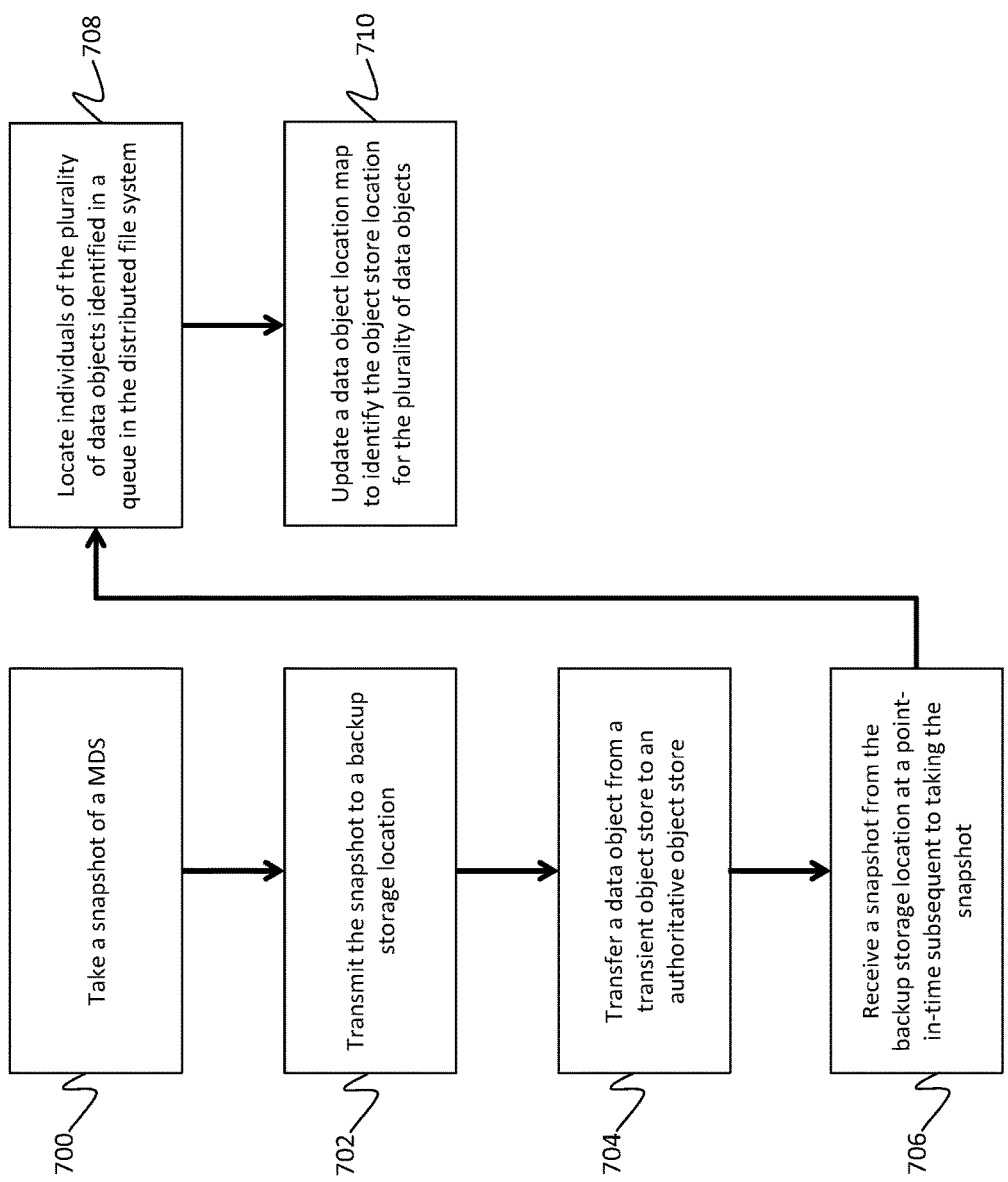
FIG. 7 depicts a process for disaster recovery in a distributed file system consistent with an embodiment of the present disclosure.

Turning now to FIG. 7, a process for repairing a site cache after disaster recovery is discussed. In an embodiment, the MDS stores a bitmap associated with an object identifier to maintain the location of data objects in the system. The MDS may also maintain a cache task queue comprising data objects that have not been moved from the site cache to the authoritative object store. Repairing both of these data structures during disaster recovery enables the system to correctly identify the data object locations.

For example, data objects A and B may reside on a site cache at the time a backup of the MDS is taken. The task queue would therefore contain A and B, and the object location bitmaps may have the bit set for the site cache but not the authoritative object store. After the backup is taken, A and B may be moved to the authoritative object store as part of a flush. The task queue would no longer contain A and B, and the object location bitmaps would have a bit set for the authoritative object store but not the site cache. A disaster or other event, however, may occur after the cache is flushed and require the MDS to be restored from the backup. Restoring the MDS from the backup will include restoring the task queue with A and B present, as well as the location bitmaps noting that A and B are on the site cache. This information is incorrect, however, since A and B were flushed to the authoritative object store after the last backup. The following process repairs this issue.

At block 700, a snapshot may be taken of the MDS. This snapshot could be, for example, a backup snapshot comprising the state of the MDS at the time it was taken. The snapshot may include an object location map for data objects in the system, such as the bit map discussed above, as well as a task queue identifying individual data objects that reside on a transient object store. This task queue could be, for example, the cache task queue discussed above. For example, the task queue and location map may indicate data objects A and B reside on the transient object store and need to be moved to the authoritative object store. The snapshot may enable the MDS to be restored to the state embodied in that snapshot.

At block 702, the snapshot may be transmitted to a backup storage location. This backup storage location by be physically and/or geographically separated from the MDS. Additionally or alternatively, the backup location may be a cloud storage location, such as Amazon S3 storage.

After the backup has been stored, data objects may be transferred from the transient object store to the authoritative object store at block 704. In an embodiment, this occurs while flushing the site cache. For example, data objects A and B may be transferred from the transient object store to the authoritative object store. The MDS may update the task queue and object location map appropriately. This could include removing A and B from the task queue, and flipping bits in a bit map to indicate the data objects are on the authoritative object store but not the transient object store.

After the backup has been stored and the data objects have been transferred, a disaster or other event may require the MDS be restored. For example, the MDS may become corrupt and an administrator may invoke a restore process.

At block 706, the snapshot may be received from the backup storage location. The snapshot may be received in response to the disaster or other event, and/or it may be received in response to an administrator invoking a restore process. In an embodiment, the snapshot comprises the state of the MDS at the time it was taken, including the task queue and the location map.

The MDS may be restored in accordance with the snapshot. In an embodiment, however, the location of data objects transmitted in block 704 may be lost. For example, data objects A and B may reside on the authoritative object store, but the restored object map may indicate they are still in the site cache. Similarly, the task queue restored from the snapshot may indicate data objects A and B need to be transferred from the site cache to the authoritative object store. Should a client request to read these data objects, it will encounter an error because the MDS will instruct the client to read from the site cache. Similarly, the task queue will also encounter an error if it attempts to move the data objects from the site cache to the authoritative object store. The remainder of the process shown in FIG. 7 helps repair these incorrect data structures.

At block 708, the MDS may iterate through or otherwise process all of the data objects identified in the task queue. The MDS may attempt to locate each data object on the queue in the system. For example, the MDS may issue an HTTP GET or HEAD request to the transient object store for a data object on the queue. If the it receives a positive response, meaning the transient object store contains the data object, the MDS may move to the next object on the queue. If the MDS receives a negative response, meaning the transient object store does not contain the data object, the MDS may issue the same request to the authoritative or other object stores in the system until the data object is found. If the data object is not found, it may be marked as unrecoverable and clients attempting to read that object may be given an error.

Finally, at block 710, the task queue and data object location map may be updated based on the discovered data objects. If the data objects still reside on the transient object store and not the authoritative object store, the task queue and data object map may remain unchanged. If the objects are on the authoritative object store but not the transient object store, they may be removed from the task queue and the data object location map may be updated. If the data object is on both object stores, it may or may not be removed from the task queue and the data object location map may be updated to show the data object is available in both locations.

While the process of FIG. 7 may restore the system to a state that existed at the time the backup was taken, there may still be a discrepancy between the site cache and the MDS. Since a site cache may be located remotely from the MDS, there is a chance the site cache was not impacted by the disaster or other event. As a result, the site cache may contain data the MDS is unaware of. For example, data object C may be written to the site cache after the backup of blocks 700/702. Once the MDS is restored, the MDS may not know this data exists. Additionally, if the object identifier includes a sequential number, as discussed above, the MDS may issue the same number to a different data object since it is unaware the identifier has already been used.

In one embodiment, the MDS may transmit the latest data object for which it has a record to the transient object stores. For example, the MDS may transmit data object B's identifier to all of the site caches. These site caches may delete all data objects with an identifier higher than B's. For example, the site cache may delete data object C. This may rectify the discrepancies between the MDS and the site cache, but may also result in data loss for the clients.

Additionally or alternatively, the MDS may request the site cache self report the data objects it contains. Once the MDS has a report of data objects on the site cache, it may update the task queue and object location tables appropriately. For example, the site cache may report that it contains data object C. The MDS may add C to the task queue, note its location on the site cache, and mark its identifier as used to prevent assigning it to a different data object in the future.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for writing a data object in a distributed file system, the method comprising:
transmitting a write request associated with the data object from a client to a metadata server;
receiving a site cache location at the client from the metadata server;
transmitting the data object to the site cache such that the data object is stored in a memory at the site cache;
maintaining a location of the data object in a task queue at the metadata server; and
flushing the data object, by the metadata server, to an authoritative object store by:
transmitting a write request by the site cache to the metadata server;
receiving an authoritative object store location from the metadata sever; and
transmitting the data object to the authoritative object store.

2. The method of claim 1, further comprising managing the task queue by the metadata server.

3. The method of claim 1, further comprising updating the metadata server after flushing the data object to an authoritative object store.

4. The method of claim 1, further comprising determining that the metadata server requires repair.

5. The method of claim 4, further comprising restoring the metadata server from a backup and correcting location of data objects identified in the snapshot that are incorrect in the restored metadata server.

6. The method of claim 5, wherein the backup corresponds to a point in time prior to flushing the data object from the site cache.

7. The method of claim 6, wherein the task queue of the restored metadata server indicates that data objects that have been moved to the authoritative object store are stored at the site cache.

8. The method of claim 7, further comprising correcting the locations of the data objects in the task queue of the restored metadata server.

9. The method of claim 8, further comprising locating the data objects identified in the task queue and updating the restored metadata server such that locations of the data objects identified in the task queue are correct.

10. The method of claim 1, further comprising taking a backup of the metadata server, the backup including a snapshot.

11. A non-transitory storage medium comprising computer executable instructions for performing operations, the operations including:
- transmitting a write request associated with the data object from a client to a metadata server;
- receiving a site cache location at the client from the metadata server;
- transmitting the data object to the site cache such that the data object is stored in a memory at the site cache;
- maintaining a location of the data object in a task queue at the metadata server; and
- flushing the data object, by the metadata server, to an authoritative object store by:
  - transmitting a write request by the site cache to the metadata server;
  - receiving an authoritative object store location from the metadata sever; and
  - transmitting the data object to the authoritative object store.

12. The non-transitory storage of claim 11, the operations further comprising managing the task queue by the metadata server.

13. T The non-transitory storage of claim 11, the operations further comprising updating the metadata server after flushing the data object to an authoritative object store.

14. The non-transitory storage of claim 11, the operations further comprising determining that the metadata server requires repair.

15. The non-transitory storage of claim 14, the operations further comprising restoring the metadata server from a backup and correcting location of data objects identified in the snapshot that are incorrect in the restored metadata server.

16. The non-transitory storage of claim 15, wherein the backup corresponds to a point in time prior to flushing the data object from the site cache.

17. The non-transitory storage of claim 16, wherein the task queue of the restored metadata server indicates that data objects that have been moved to the authoritative object store are stored at the site cache.

18. The non-transitory storage of claim 17, the operations further comprising correcting the locations of the data objects in the task queue of the restored metadata server.

19. The non-transitory storage of claim 18, the operations further comprising locating the data objects identified in the task queue and updating the restored metadata server such that locations of the data objects identified in the task queue are correct.

20. The non-transitory storage of claim 11, the operations further comprising taking a backup of the metadata server, the backup including a snapshot.

* * * * *